US012607552B2

(12) United States Patent (10) Patent No.: US 12,607,552 B2
Ducousso et al. (45) Date of Patent: Apr. 21, 2026

(54) LASER SHOCK METHOD

(71) Applicants: SAFRAN, Paris (FR); CENTRE NATIONAL DE LA RECHERCHE SCIENTIFIQUE, Paris (FR); SORBONNE UNIVERSITE, Paris (FR); ECOLE NATIONALE SUPERIEURE D'ARTS ET METIERS (ENSAM), Paris (FR); CONSERVATOIRE NATIONAL DES ARTS ET METIERS, Paris (FR)

(72) Inventors: Mathieu Loïc Ducousso, Moissy-Cramayel (FR); Edouardo Cuenca, Moissy-Cramayel (FR); François Coulouvrat, Paris (FR); Laurent Berthe, Paris (FR)

(73) Assignees: SAFRAN, Paris (FR); CENTRE NATIONAL DE LA RECHERCHE SCIENTIFIQUE, Paris (FR); SORBONNE UNIVERSITE, Paris (FR); ECOLE NATIONALE SUPERIEURE D'ARTS ET METIERS (ENSAM), Paris (FR); CONSERVATOIRE NATIONAL DES ARTS ET METIERS, Paris (FR)

( * ) Notice: Subject to any disclaimer, the term of this patent is extended or adjusted under 35 U.S.C. 154(b) by 434 days.

(21) Appl. No.: 18/282,176

(22) PCT Filed: Feb. 23, 2022

(86) PCT No.: PCT/FR2022/050330
§ 371 (c)(1),
(2) Date: Sep. 14, 2023

(87) PCT Pub. No.: WO2022/195190
PCT Pub. Date: Sep. 22, 2022

(65) Prior Publication Data
US 2024/0159655 A1 May 16, 2024

(30) Foreign Application Priority Data

Mar. 15, 2021 (FR) ...................................... 2102538

(51) Int. Cl.
*G01N 21/17* (2006.01)

(52) U.S. Cl.
CPC . *G01N 21/1702* (2013.01); *G01N 2021/1706* (2013.01)

(58) Field of Classification Search
CPC ....... G01N 21/1702; G01N 2021/1706; G01N 19/04; G01N 2203/0057; G01N 2291/0231; G01N 29/2418; G01N 29/043
See application file for complete search history.

(56) References Cited

U.S. PATENT DOCUMENTS

| | | |
|---|---|---|
| 7,509,876 B1 | 3/2009 | Sokol et al. |
| 2016/0109343 A1 | 4/2016 | Bossi et al. |
| 2016/0131557 A1 | 5/2016 | Bossi et al. |

OTHER PUBLICATIONS

International Patent Application No. PCT/FR2022/050330, International Search Report dated May 18, 2022 with English translation, 11 pages.

(Continued)

*Primary Examiner* — Tarun Sinha
(74) *Attorney, Agent, or Firm* — Cozen O'Connor

(57) ABSTRACT

A method for focusing acoustic waves on an interface between two layers of a multilayer structure includes providing laser means able to emit a laser beam toward an exterior surface of the multilayer structure to produce a longitudinal wave from the centre of a laser-beam spot projected onto the exterior surface and a transverse wave from the periphery of said spot, determining the distance between said interface and the exterior surface, determining one or more propagation velocities of each of the longitudinal wave and the transverse wave in the one or more layers (Continued)

passed through by said waves to reach said interface, and determining a radius of the laser-beam spot depending on the one or more propagation velocities and on said distance so that the time taken by the longitudinal wave to reach said interface is equal to three times the time taken by the transverse wave to reach said interface.

8 Claims, 4 Drawing Sheets

(56) References Cited

OTHER PUBLICATIONS

Ecault Romain et al. "Laser shock adhesion test numerical optimization for composite bonding assessment", Composite Structures, Elsevier Science Ltd, GB, vol. 247, May 4, 2020, pp. 1-12.

L. Berthe et al., "State-of-the-art laser adhesion test (LASAT)" Nondestructive Testing and Evaluation, US, vol. 26, No. 3-4, Sep. 1, 2011, pp. 303-317.

Bolis C et al. "Physical approach to adhesion testing using laser-driven shock waves" Journal of Physics D: Applied Physics, Institute of Physics Publishing, Bristol, GB, vol. 40, No. 10, May 21, 2007 (May 21, 2007), pp. 3155-3163.

LASER SHOCK METHOD

CROSS-REFERENCE TO RELATED APPLICATIONS

This application is a US National phase Application of International Patent Application No. PCT/FR2022/050330 filed Feb. 23, 2022, which claims priority to FR No. 2102538 filed Mar. 15, 2021, titled "Laser Shock Method," both of which are hereby incorporated in their entireties.

TECHNICAL FIELD OF THE INVENTION

The present document relates to a method for configuring a laser beam to check structural bonding by the so-called laser shock method.

PRIOR ART

Laser shock methods are known for the non-destructive assessment of structural bonding of two layers of different materials. A structural bonding is a bonding withstanding the application of a mechanical load.

These laser shock methods comprise the illumination of a structure assembled by bonding with an intense and brief laser beam. Such a structure is shown in FIG. 1. The structure 1 comprises two layers 2, 3 bonded together by a glue joint at a bonded interface 4. The laser illuminates a front surface 5 of the structure 1. The high optical intensity of the laser creates a laser/material interaction which generates a dense plasma which expands from the front surface 5 of the illuminated structure. This causes the propagation of a longitudinal wave 7 in the illuminated structure 1. FIG. 1 shows the propagation of the longitudinal wave 7 in the structure over time which is on the ordinate axis 9.

The head 6 of the longitudinal wave 7 is first compressed and the tail 8 of the longitudinal wave 7 is expanded. The time difference between the head 7 and the tail 8 of the longitudinal wave 7 is proportional to the duration of the laser pulse.

Afterwards, this longitudinal wave 7 will cross the bonded interface 4, will be reflected on a rear surface 10 of the structure and will undergo a phase change: from compression/expansion to expansion/compression. Afterwards, the longitudinal wave 7 will return back to the bonded interface 4 while pulling on the material. When it pulls on the glue joint, the latter will either resist this tension or collapse thereby. Thus, it is possible to report the mechanical strength of a glue joint with respect to the tension exerted in the bonding by the laser shock method. These methods are still limited because they are effective only if the longitudinal wave 7 is intense enough compared to the bonding strength. The main losses of intensity of the longitudinal wave 7 being generally geometric such as the distances traveled and the number of interfaces crossed. Indeed, the ultrasonic attenuation of the shock wave resulting from an acoustic path that is too long or interfaces having an impedance ratio that is too high could be limiting factors for these methods.

Optimized laser shock methods are also known which use a double laser pulse on either side of the structure 1 to be inspected, which allows generating two counter-propagating longitudinal waves 7, 7' as shown in FIG. 2. These two longitudinal waves 7, 7' could intersect at a desired location in the thickness of the structure 1 according to the delay ΔT between the two lasers.

Other optimized laser shock methods are known which use a double laser pulse on the same side of the assembled structure, which allows generating two longitudinal waves 7, 7' which follow each other and could interact at a given location, according to the delay ΔT between the two lasers, of the structure 1 so as to generate a local tension peak in the thickness of the structure 1.

Nevertheless, these methods are still limited and could be used only on structures with thin layers and also risk damaging the structure. In addition, these methods are complex and expensive to implement.

There is a need for a laser shock method, for example to check bonding of thick structures in acoustics terms and which allows guaranteeing a good strength of the assembly of the layers.

SUMMARY OF THE INVENTION

To this end, this disclosure provides a method for focusing acoustic waves at an interface between two layers of a multilayer structure, the method comprising:

providing laser means capable of emitting a laser beam in the direction of an external surface of the multilayer structure to produce a longitudinal wave from the center of a spot of the laser beam projected on the external surface and a transverse wave from the periphery of said spot, determining the distance between said interface and the external surface, determining one or more propagation velocit(y/ies) of the longitudinal wave and one or more propagation velocit (y/ies) of the transverse wave from the layer(s) crossed by said waves to reach said interface, determining a radius of the spot of the laser beam according to the propagation velocit(y/ies) and to said distance so that the travel time of the longitudinal wave to reach said interface is equal to three times the travel time of the transverse wave to reach said interface.

The method associates the tensions generated by the longitudinal wave, originating from the middle of the spot, and the transverse wave originating from the edges of the spot to generate a tensile peak when these two waves are superimposed at the desired distance in the thickness of the multilayer structure. The Inventors have noticed that the determination of the radius of the spot allows optimizing the intensity of the mechanical tension generated at the desired distance from a single laser, in contrast with the prior art, thereby reducing the complexity and the cost of the configuration of the laser in particular in laser shock applications. Furthermore, the method allows controlling an assembly having a geometry such as a layer with a finite thickness on an infinite layer (in ultrasonics terms) or having a high acoustic damping coefficient. For example, this method is particularly suitable for checking assemblies of the metal-on-composite type, and where the composite is very thick, very attenuating or with a low structural quality with regards to the tension generated by the laser beam.

The distance may correspond to the thickness of a first layer of the multilayer structure carrying the first external surface.

The radius of the spot of the laser beam may be determined by the following formula:

$$r = e\sqrt{\frac{9V_T^2 - V_L^2}{V_L^2}}$$

[math 1]

With r being the radius of the spot of the laser beam, e being the thickness of the first layer, $V_L$ being the propagation velocity of the longitudinal wave of the first layer, and $V_T$ being the propagation velocity of the transverse wave of the first layer.

This formula may be used in the case of a two-layer structure.

In the case of a multilayer structure, another interface may be selected based on the same acoustic principles and by setting the radius of the laser spot such that the longitudinal and transverse waves converge at the interface of interest.

The radius of the spot of the laser beam and/or the intensity of the laser beam and/or the time difference between an expansion portion and a compression portion of the longitudinal wave, respectively of the transverse wave, may be determined by numerical simulation. The laser beam may have an intensity having a substantially square ("top-hat") profile.

The first layer may be a layer comprising a metal, for example titanium, the multilayer structure further comprising a second layer adjacent to the first layer comprising a composite.

The second layer may have a thickness larger than the thickness of the first layer.

The second layer may have a thickness considered as semi-infinite at the acoustic wave level.

The first layer and the second layer may be bonded, for example by a glue joint.

The method for focusing acoustic waves may be used to configure laser means in a method for verifying the quality of bonding between two layers in a multilayer structure. For example, the method for focusing acoustic waves may thus be used to focus the laser beam at a bonded interface in a multilayer structure with a given intensity. If the bonded interface withstands the tension generated by the longitudinal wave and the transverse wave, the glue joint at this interface is considered to be resistant.

The multilayer structure may be a portion of a leading edge of a fan blade in a turbine engine.

The thickness of the first layer may be smaller than 5 mm, in particular smaller than 1 mm. The thickness of the second layer may be larger than 10 mm.

The laser beam may have a pulse duration ranging from a few picoseconds to ten nanoseconds, and a peak illumination ranging up to ten GW/cm$^2$ at the external surface. The duration of the laser pulse may depend on the thicknesses of the structures to be inspected. Conventionally, the duration of the laser pulse is in the range of sub-nanoseconds to inspect sub-millimetric structures and in the range of nanoseconds for thicker structures.

The method for focusing acoustic waves may be used to detach two different layers in a multi-layered structure. Thus, the method for focusing acoustic waves may be used for the selective disassembly of a multilayer structure by superimposing the tension generated by the longitudinal wave and the transverse wave at the interface in the structure to be disassembled.

The present document also relates to a device for focusing acoustic waves including means configured for the implementation of the method as mentioned before. For example, said device may comprise at least one laser and means for configuring the laser capable of determining the radius of the spot of the laser beam.

The present document further relates to a computer program including instructions for the implementation of at least one portion of the method as mentioned before, when said instructions are executed by a processor of a processing circuit.

DETAILED DESCRIPTION OF THE INVENTION

Figure 1:
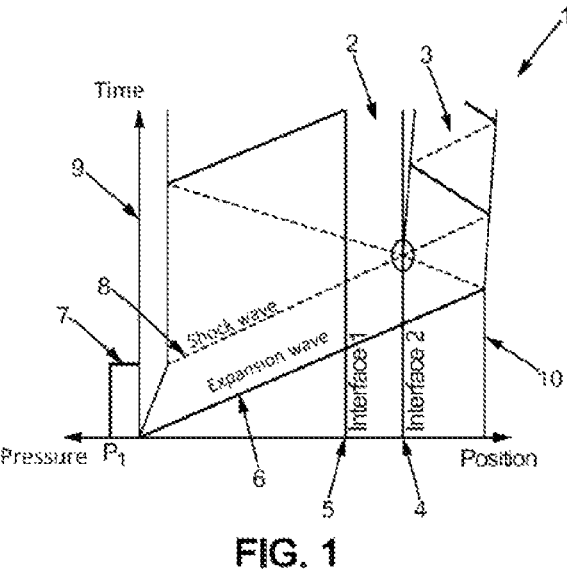
FIG. 1, described above, shows an exposure diagram of a multilayer structure to a laser beam according to the prior art.
Figure 2:
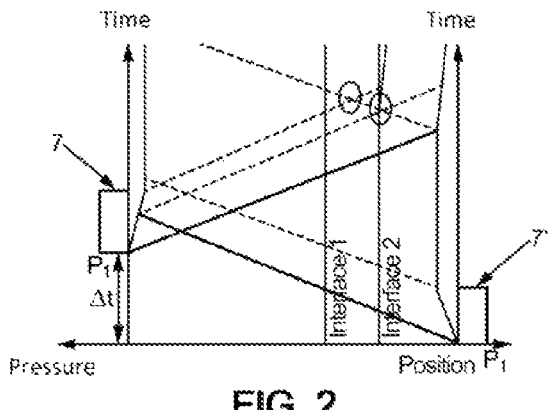
FIG. 2, described above, shows an exposure diagram of a multilayer structure with two laser beams on two opposite faces of the structure according to the prior art.
Figure 3:
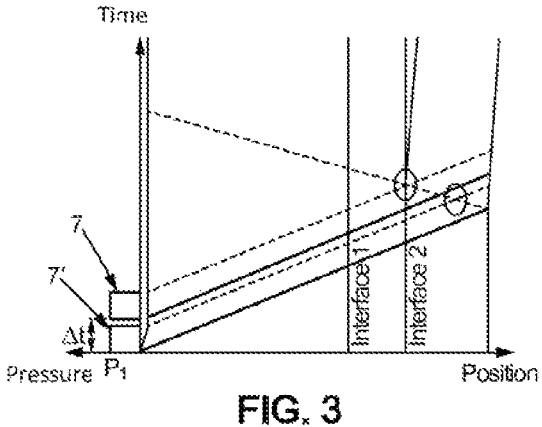
FIG. 3, described above, shows an exposure diagram of a multilayer structure with two laser beams on the same face of the structure according to the prior art.
Figure 4:
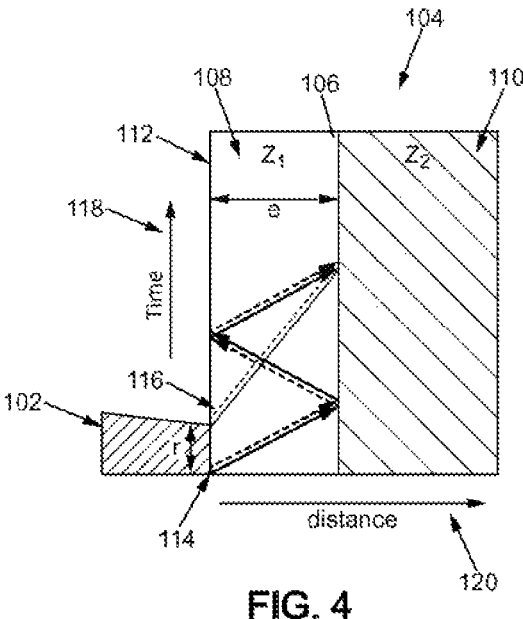
FIG. 4 shows an exposure diagram of a multilayer structure according to an example of the method of the present document.
Figure 5:
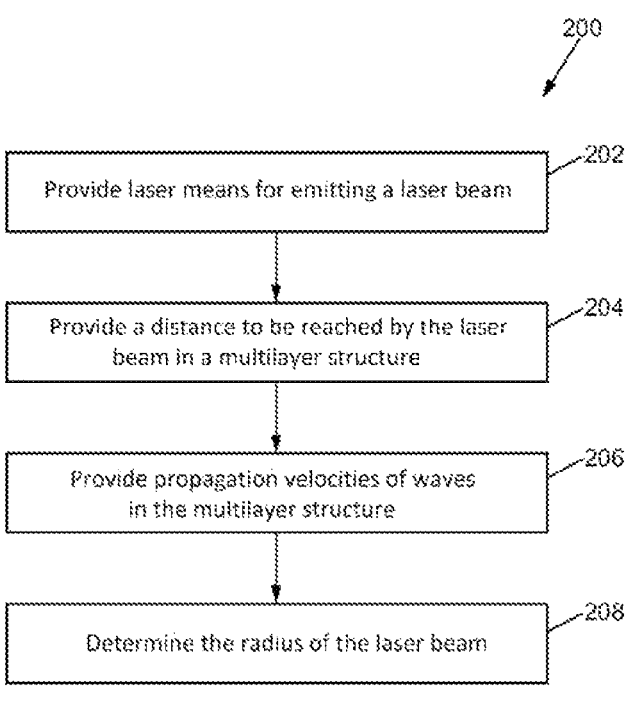
FIG. 5 shows a block diagram of an example of the method of the present document.

Referring to FIGS. 4 and 5, the method 200 allows focusing acoustic waves of a laser beam 102 at a given thickness e in a multilayer structure 104 in order to produce a tensile force at said thickness e.

The method 200 comprises a step 202 of providing laser means to emit the beam 102.

The method comprises a step 204 of providing the desired thickness e. This thickness e corresponds to an interface 106 between a first layer 108 and a second layer 110 of the multilayer structure 104. The first layer 108 and the second layer 110 are bonded together at the interface 106 by a glue joint.

The thickness of the second layer 110 is larger than the thickness of the first layer 108, in particular the thickness of the second layer 110 may be considered as being semi-infinite from in acoustics terms.

The first layer 108 is made of a first material having a first impedance Z1 and the second layer 110 is made of a second material different from the first material and having a second impedance Z2.

In particular, the first layer 108 is a layer made of a metal, for example titanium, and the second layer 110 is a layer made of a composite material.

The laser beam 102 has an intensity having a substantially square profile.

When the laser beam 102 is projected on an external surface 112 of the multilayer structure 104, a longitudinal wave 114 originating from a central portion of a projection spot of the laser beam 102 on the external surface 112 and a transverse wave 116 originating from a peripheral portion of the spot propagate in the structure 104 according to the direction 120. The peripheral portion surrounds the central portion.

The longitudinal wave 114 has a compressed head shown in solid line and followed overtime according to the axis 118 by an expanded tail shown in broken line. The longitudinal wave 114 undergoes a phase change from expansion to compression and vice versa at each interface encountered between different materials, namely the interface 106 and the external surface 112. The transverse wave 116 also has a compressed head shown in continuous line and followed over time according to the axis 118 by an expanded tail shown in broken line.

The transverse wave 116 propagates in the multilayer structure 104 at a propagation velocity $V_T$ in the first layer 108 lower than the propagation velocity $V_L$ of the longitudinal wave 114 in the first layer 108.

The method 200 also comprises a step 206 of providing the propagation velocity $V_T$ of the transverse wave 116 and the propagation velocity $V_L$ of the longitudinal wave 114.

To create a tensile peak at the interface 106, the laser beam 102 is configured so that the longitudinal wave 114 is superimposed with the transverse wave 116 at the interface 106.

For this purpose, the method 200 comprises a step 208 of determining the radius r of the laser beam 102 according to the thickness e and the propagation velocities $V_T$ and $V_L$. The radius r of the laser beam 102 is determined so that the travel time of the longitudinal wave 114 to reach the interface 106 is equal to three times the travel time of the transverse wave 116 to reach the interface 106.

The radius is determined by the following formula:

$$r = e\sqrt{\frac{9V_T^2 - V_L^2}{V_L^2}}$$ [math 2]

The radius r thus determined allows improving the tensile force at the interface 106 in a simple and inexpensive manner.

The method 200 may be used in a method for verifying the quality of bonding between the two layers 108 and 110. For example, method 200 may thus be used to focus the laser beam 102 at the bonded interface 106 to generate a given tensile force. If the bonded interface 106 withstands the tension generated by the longitudinal wave 114 and the transverse wave 116, the glue joint at this interface 106 is considered to be resistant.

The method 200 may be used to detach the two layers 108 and 110 by applying a suitable tensile force.

Figure 6:
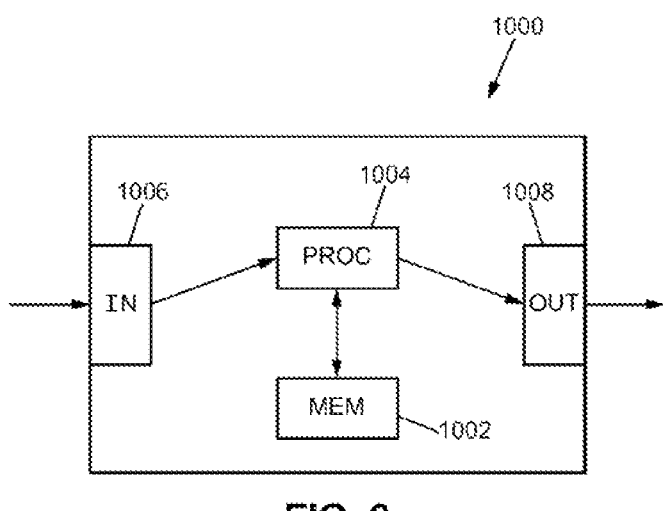
FIG. 6 shows a schematic block diagram of a processing circuit for the implementation of an example of the method according to the present description.

FIG. 6 illustrates, according to a particular embodiment of the invention, a device 1000 for implementing the acoustic wave focusing method.

The device 1000 comprises a storage space 1002, for example a memory MEM, and a processing unit 1004 equipped for example with a processor PROC. For example, the storage space 1002 is a non-volatile memory (ROM or Flash, for example), and may form a recording medium, this recording medium may further comprise a computer program.

The device 1000 further comprises a communication module enabling said device to connect to a network to exchange data with other devices. For example, the communication module may be a Wifi or Ethernet network interface, or a Bluetooth communication module.

The communication module of the device 1000 comprises a data reception module 1006, for example an IN receiver, and a data emission module 1008, for example an OUT emitter.

The module 1006 is configured to receive the distance between the interface where the laser beam will be focused and the external surface of the structure, propagation velocities of the longitudinal and transverse waves in the structure. The module 1008 is configured to return back a ray of the laser beam.

The storage space 1002, which may be secure, is configured to record and store any data read by the module 1006, processed by the unit 1004 and/or sent by the module 1008.

The processing unit 1004, which may be controlled by a program, is configured to implement the method 200 for focusing acoustic waves as described with reference to FIG. 5.

Upon initialization, the instructions of a program driving the processing unit 1004, are for example loaded into a random-access memory (RAM, for example) not shown that the device 1000 comprises, before being executed by the processor of the processing unit 1004.

The invention claimed is:

1. A method of focusing acoustic waves at an interface between two layers of a multilayer structure, the method comprising:

emitting a laser beam in the direction of an external surface of the multilayer structure, the laser beam defining a spot at the external surface, the spot having a center and a periphery, the emission of the laser beam thereby producing a longitudinal wave propagating from the center of the spot and a transverse wave propagating from the periphery of the spot;

determining a distance between said interface and the external surface;

determining one or more propagation velocities $V_L$ of the longitudinal wave and one or more propagation velocities $V_T$ of the transverse wave to reach said interface from the layer(s) crossed by said longitudinal and transverse waves; and determining a radius r of the spot of the laser beam as a function of the propagation velocities and of said distance so that a travel time of the longitudinal wave to reach said interface and to be superimposed with the transverse wave is equal to three times a travel time of the transverse wave to reach said interface and to be superimposed with the longitudinal wave.

2. The method according to claim 1, wherein the distance corresponds to a thickness e of a first layer of the multilayer structure, the first layer carrying the first external surface.

3. The method according to claim 2, wherein the radius of the spot of the laser beam is determined by the following formula:

$$r = e\sqrt{\frac{9V_T^2 - V_L^2}{V_L^2}}$$

wherein r is the radius of the spot of the laser beam, e is the thickness of the first layer, $V_L$ is the propagation velocity of the longitudinal wave of the first layer, and $V_T$ is the propagation velocity of the transverse wave of the first layer.

4. The method according to claim 1, wherein the laser beam has an intensity having a substantially square profile.

5. The method according to claim 2, wherein the first layer is a layer comprising a metal, for example titanium, the multilayer structure further comprising a second layer adjacent to the first layer, the second layer comprising a composite material.

6. The method according to claim 5, wherein the second layer has a thickness that is larger than the thickness e of the first layer.

7. The method according to claim 5, wherein the first layer and the second layer are bonded.

8. A device including a processing circuit configured for performing a method of focusing acoustic waves at an interface between two layers of a multilayer structure, the method comprising:

emitting a laser beam in the direction of an external surface of the multilayer structure, the laser beam defining a spot at the external surface, the spot having a center and a periphery, the emission of the laser beam thereby producing a longitudinal wave propagating from the center of the spot and a transverse wave propagating from the periphery of the spot;

determining a distance between said interface and the external surface;

determining one or more propagation velocities $V_L$ of the longitudinal wave and one or more propagation velocities $V_T$ of the transverse wave to reach said interface from the layer(s) crossed by said longitudinal and transverse waves; and determining a radius r of the spot of the laser beam as a function of the propagation velocities and of said distance so that a travel time of the longitudinal wave to reach said interface and to be superimposed with the transverse wave is equal to three times a travel time of the transverse wave to reach said interface and to be superimposed with the longitudinal wave.

\* \* \* \* \*